United States Patent
Boek et al.

(10) Patent No.: US 6,917,740 B2
(45) Date of Patent: Jul. 12, 2005

(54) OPTICAL FIBER HAVING REDUCED VISCOSITY MISMATCH

(75) Inventors: Heather D. Boek, Corning, NY (US); Michael T. Murtagh, Horseheads, NY (US); Sabyasachi Sen, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 210 days.

(21) Appl. No.: 10/449,969

(22) Filed: May 30, 2003

(65) Prior Publication Data

US 2004/0240814 A1 Dec. 2, 2004

(51) Int. Cl.$^7$ .............................. G02B 6/02; G02B 6/22
(52) U.S. Cl. ...................... 385/123; 385/127; 385/128
(58) Field of Search ................................. 385/123–132

(56) References Cited

U.S. PATENT DOCUMENTS

| | | | |
|---|---|---|---|
| 5,090,979 A | 2/1992 | Le Sergent et al. ........... 65/3.12 |
| 6,343,175 B1 * | 1/2002 | Sasaoka ....................... 385/123 |
| 6,442,313 B2 * | 8/2002 | Yamauchi et al. ............. 385/37 |
| 6,519,403 B1 | 2/2003 | Hirano et al. ................ 385/127 |
| 2003/0221459 A1 | 12/2003 | Walczak ....................... 65/398 |

FOREIGN PATENT DOCUMENTS

| | | | |
|---|---|---|---|
| EP | 1 191 367 | 3/2002 | ............ G02B/6/16 |
| WO | WO 03/037810 | 5/2003 | ......... C03B/37/018 |

OTHER PUBLICATIONS

Tanaka, Daiichirou et al., "High Silica Core Single–Mode Fibers for 1.55$\mu$m Transmission", Fujikara Technical Review, Tokyo, No. 19, Jan. 1990, pp. 1–6, XP002924320.
Saggese, Steven J., et al. "Properties of Chlorofluoroziroconate Glasses", Journal of Non–Crystalline Solids, 119 (1990) p. 187–194, XP000126462.

* cited by examiner

*Primary Examiner*—Akm Enayet Ullah
*Assistant Examiner*—Tina M. Lin
(74) *Attorney, Agent, or Firm*—Kevin M. Able

(57) ABSTRACT

An optical fiber is disclosed in which the core region of the optical fiber is doped with Cl and F in order to reduce the viscosity mismatch between the core region and the adjacent cladding region. In one embodiment of the invention, the optical fiber is a single-mode step index optical fiber having a core region doped with Cl and F in an amount effective to produce a difference in temperature between the glass transition temperature of the core region and the glass transition temperature of the adjacent cladding region of less than about 200° C.

14 Claims, 11 Drawing Sheets

OPTICAL FIBER HAVING REDUCED VISCOSITY MISMATCH

BACKGROUND OF THE INVENTION

1. Field of the Invention

The present invention relates generally to an optical fiber, and particularly to an optical fiber having a reduced viscosity mismatch between the core region and an adjacent cladding segment.

2. Technical Background

Conventional single-mode optical fibers typically have an $SiO_2$ (silica) glass core region doped with a dopant suitable for raising the refractive index of the core region, and surrounded by a cladding glass of pure silica. A typical core region dopant is $GeO_2$. The index difference between the core and the cladding is necessary to create a light guide wherein propagating light is generally confined to the core region. The concentration of $GeO_2$ found in a conventional single-mode doped-core optical fiber may be in excess of 7 weight percent (wt. %). Because the high concentration of dopant is located in the core region of the optical fiber, the optical loss, or attenuation, of the optical fiber is higher than the attenuation expected in pure silica glass. To overcome the light absorbing characteristic of a core region containing relatively high concentrations of one or more dopants, pure silica core optical fibers were developed. That is, optical fibers having a core region composed of pure silica.

To create the refractive index difference between the core region and the cladding region in a pure silica core optical fiber, one or more refractive index-modifying dopants are added to the cladding region to reduce the refractive index of the cladding region to a value below the refractive index of the pure silica core region. For example, fluorine (F) is a commonly employed dopant to decrease the refractive index of the silica glass cladding region. The degree to which the refractive index of the cladding region of a pure silica core optical fiber is decreased below the refractive index of the core region depends upon the optical fiber design and the desired optical fiber parameters, but the addition of the index-modifying dopant to the cladding region rather than the core region eliminates the optical loss due to the presence of dopants in the core. Doping the cladding region also affects the viscosity of the cladding glass. That is, when a dopant such as F is added to a silica glass cladding region, the viscosity of the cladding region is lowered, resulting in a viscosity mismatch between the pure silica core glass and the doped silica cladding glass.

For a given set of draw conditions, one region of an optical fiber having a viscosity lower than the viscosity of another region results in the region of the optical fiber having the higher viscosity bearing more of the draw tension. For a pure silica core optical fiber this means the light-guiding core supports the tensile stress applied to the optical fiber during the draw process. The resulting stress may be retained within the optical fiber as residual stress. Residual stress, that is, stress that has been frozen into the fiber upon cooling from the draw temperature, is one cause of increased transmission loss. As a consequence, pure silica core optical fibers are typically drawn at very slow draw speeds, on the order of 1 meter per second, to minimize residual stress.

To mitigate the potential for increased residual stress, small amounts of chlorine (Cl) have been used as a core region dopant in otherwise pure silica core optical fibers in an effort to match the viscosity of the core glass to the viscosity of the cladding glass. However, the generally low level of chlorine that has been used, about 1 wt. % or less, has by itself been insufficient to adequately match the viscosity of the core region to the viscosity of the cladding region. Since Cl alone is not an effective modifier of viscosity, large amounts of Cl are required to closely match the core viscosity to the cladding viscosity. However, the high volatility of Cl limits the amount of Cl that can be added to the core region in some optical fiber manufacturing methods, such as those that employ outside vapor deposition (OVD) or vapor axial deposition (VAD). The inability to dope an adequate amount of Cl into the core region has limited the effectiveness of this approach, thus very slow draw speeds and high draw furnace temperatures are still typically required to avoid draw-induced defects such as voids in the glass, excess residual stress, and increased optical fiber attenuation in the manufacture of silica core optical fiber. Prior art optical fibers having predominantly pure silica cores continue to have high residual stresses—on the order of between about 50 MPa and 60 MPa.

Thus, there is a need for a means of more closely matching the viscosity between different regions of an optical fiber.

SUMMARY OF THE INVENTION

In one embodiment of the present invention an optical fiber is disclosed having a core region having a refractive index $n_1$, a relative refractive index $\%\Delta_1$, and a glass transition temperature $T_{g1}$; a first cladding segment disposed about and in contact with the outer periphery of the core region, wherein the first cladding segment has a refractive index $n_2$, a relative refractive index $\%\Delta_2$, and a glass transition temperature $T_{g2}$; and wherein the core region is doped with Cl and F, and the Cl and F are in an amount by wt. % effective to yield a difference between $T_{g1}$ and $T_{g2}$ of less than about 200° C.

Preferably, the core region according to the present invention is doped with Cl and F in an amount by wt. % effective to yield a difference between $T_{g1}$ and $T_{g2}$ of less than about 150° C., more preferably less than about 100° C.

Preferably, the optical fiber according to the present invention has a core relative refractive index, relative to the first cladding segment, between about 0.3 and 0.54%.

Preferably the core region of the optical fiber is doped with between 0.1 wt. % and 3 wt. % Cl, more preferably between about 0.5 wt. % and 2 wt. %. Preferably the core region is doped with between about 0.1 wt. % and 2 wt. % F, more preferably between about 0.5 wt. % and 1 wt. %. Preferably the ratio of F concentration to Cl concentration in the core region is between about 1:2 and 1:4.

In another embodiment according to the present invention, an optical fiber is disclosed having a refractive index profile comprising a core region having a relative refractive index with respect to pure silica % $\Delta_1$; a first cladding segment disposed about and in contact with the core region having a relative refractive index with respect to pure silica % $\Delta_2$; a second cladding segment disposed about and in contact with the first cladding segment having a relative refractive index with respect to pure silica % $\Delta_3$; and wherein $|\%\Delta_3|<|\%\Delta_1|<|\%\Delta_2|$, more preferably $|\%\Delta_1|<|\%\Delta_3|<|\%\Delta_2|$, and % $\Delta_1$, % $\Delta_2$ and % $\Delta_3$ are negative.

In still another embodiment, an optical fiber is disclosed having a refractive index profile comprising a core region having a relative refractive index with respect to pure silica % $\Delta_1$; a first cladding segment disposed about and in contact with the core region having a relative refractive index with respect to pure silica % $\Delta_2$; a second cladding segment disposed about and in contact with the first cladding segment having a relative refractive index with respect to pure silica % $\Delta_3$; and wherein $|\% \Delta_3|<|\% \Delta_1|<|\% \Delta_2|$, and % $\Delta_1$, % $\Delta_2$ and % $\Delta_3$ are negative.

In yet another embodiment according to the present invention, an optical fiber is disclosed having a refractive index profile comprising a core region having a relative refractive index with respect to pure silica % $\Delta_1$; a first cladding segment disposed about and in contact with the core region having a relative refractive index with respect to pure silica % $\Delta_2$; a second cladding segment disposed about and in contact with the first cladding segment having a relative refractive index with respect to pure silica % $\Delta_3$; and wherein $|\% \Delta_3|<|\% \Delta_2|$, % $\Delta_3$ and % $\Delta_2$ are negative, and % $\Delta_1$ is positive.

Preferably, the optical fiber according to the present invention has an attenuation less than about 0.21 dB/km.

Preferably, the optical fiber according to the present invention is drawn at a draw speed greater than about 2 meters per second, more preferably greater than about 9 meters per second.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description present embodiments of the invention, and are intended to provide an overview or framework for understanding the nature and character of the invention as it is claimed. The accompanying drawings are included to provide a further understanding of the invention, and are incorporated into and constitute a part of this specification. The drawings illustrate various embodiments of the invention, and together with the description serve to explain the principles and operations of the invention.

DETAILED DESCRIPTION OF THE PREFERRED EMBODIMENTS

Figure 1:
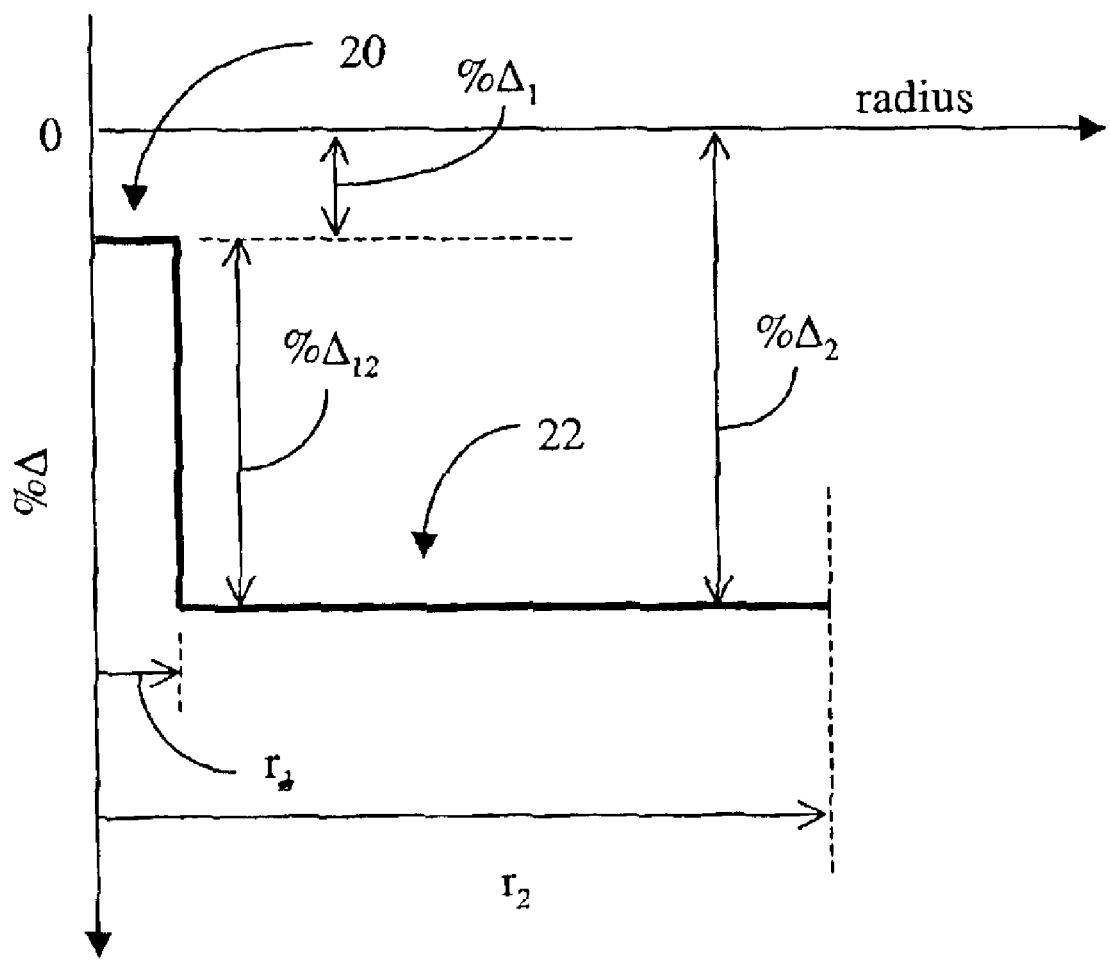
FIG. 1 is an illustration of a refractive index profile according to an embodiment of the present invention.

In the following, preferred embodiments of the optical fiber in accordance with the present invention will be explained in detail with reference to the drawings. In the explanation of the drawings, constituents identical to each other will be referred to with numerals or letters identical to each other, without repeating their overlapping descriptions. Also, ratios of sizes in the drawings do not always coincide with those explained.

The relative refractive index, $\Delta$, is defined by the equation, $$\Delta=(n_i^2-n_r^2)/2n_i^2 \tag{1}$$

where $n_i$ is the maximum refractive index of the index profile segment i, and $n_r$ is a reference refractive index. The reference refractive index may be the refractive index of pure silica or it may be the refractive index of the cladding region. Unless otherwise indicated, the relative refractive index as used hereinafter, is expressed as being relative to pure silica. The relative refractive index is typically expressed as a percent, and is indicated as % $\Delta$.

For the optical fiber disclosed herein, the term "region" describes a general structural feature of the optical fiber, for example the core region or the cladding region. Some optical fiber designs may have a cladding region comprised of additional sub-features, such as, for example, areas of raised refractive index or lowered refractive index. In this instance, each area containing such a sub-feature is termed a segment. Thus, a cladding region, for example, may have a plurality of cladding segments. Cladding segments may also be distinguished by the stage of manufacturing during which the segment was created. For example, some outside vapor deposition processes deposit the core glass and a thin portion of cladding glass during a single processing step. Additional cladding glass is applied during a later processing step and may be added, for example, by a vapor deposition process or by sleeving the core preform with a glass cladding tube. In such instances, the two areas of cladding glass may be considered separate segments of the cladding region. For the optical fibers disclosed herein, the notation % $\Delta_1$ is used to describe the relative refractive index of the optical fiber core region relative to pure silica; the notation % $\Delta_2$ is used to describe the relative refractive index of a first cladding segment, adjacent to and in contact with the core region; the notation % $\Delta_3$ is used to describe the relative refractive index of a second cladding segment, adjacent to and in contact with the first cladding segment, and so forth.

A plot of the relative refractive index % $\Delta$ as a function of the radius of the optical fiber is termed a refractive index profile.

In a preferred embodiment of the present invention an optical fiber, depicted in the refractive index profile of FIG. 1, is comprised of a core region 20 having a radius $r_1$, a maximum index of refraction $n_1$ ($n_1<n_0$ where $n_0$ is the refractive index of pure silica), a relative refractive index % $\Delta_1$ with respect to pure silica, a relative refractive index %

$\Delta_{12}$ with respect to the adjacent cladding segment, and a glass transition temperature $T_{g1}$. The optical fiber is further comprised of a single cladding segment 22 disposed about and in contact with core region 20, and having a radius $r_2$, a minimum refractive index $n_2$ ($n_2 < n_1$), a relative refractive index % $\Delta_2$, and a glass transition temperature $T_{g2}$. The core region is pure silica glass doped with F and Cl, and $|\% \Delta_1| < |\% \Delta_2|$. Pure silica is represented by the horizontal axis at % $\Delta = 0$ in FIG. 1.

Figure 2:
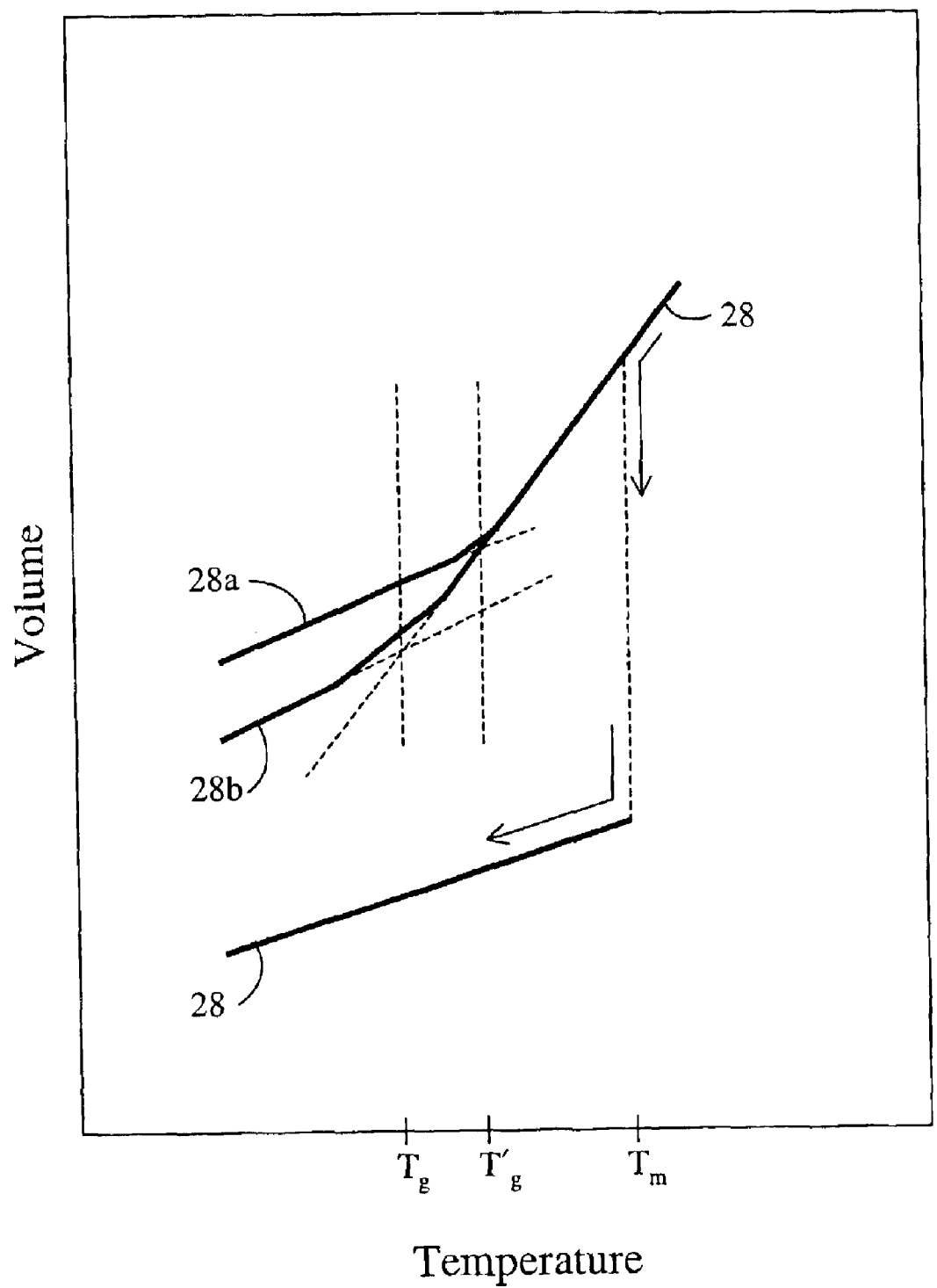
FIG. 2 depicts volume vs. temperature for a glass, illustrating the definition of glass transition temperature $T_g$.

$T_g$ is generally taken to be the temperature at which the amorphous phase of a material has a discontinuity in its thermodynamic properties such as, for example, thermal expansion and heat capacity, as the material is cooled from temperatures at which the material is liquid to temperatures at which the material is crystalline. Referring to FIG. 2, as a liquid that normally does not form a glass is cooled, it crystallizes at or slightly below the melting temperature $T_m$ (path 28). If there are insufficient crystal nuclei or if the viscosity is too high to allow sufficient crystallization rates, under-cooling of the liquid can occur. However, the viscosity of the liquid rapidly increases with decreasing temperatures, and atomic rearrangement slows down more than would be typical for the super-cooled liquid. This results in the deviation from the metastable equilibrium curve which is depicted by paths 28a and 28b in FIG. 2. This change in slope with temperature is characteristic of a glass. Structural rearrangement is too slow to be detected experimentally, and additional volume changes are virtually linear with continued cooling, the same for any other single-phase solid. The cooling rate determines when the deviation begins to occur. A slower cooling (path 28b), for example, results in less of a deviation from the extrapolated liquid curve. FIG. 2 shows that the point of intersection of the two slopes defines a transformation point (glass transition temperature) $T_g$ for a given cooling rate. Practical limitations on cooling rate define the transformation range between $T_g$ and $T_g'$ as the temperature range in which the cooling rate can affect the structure-sensitive properties such as density, refractive index, and volume resistivity. The structure, which is frozen in during the glass transformation, persists at all temperatures below $T_g$. Thus, a glass has a configurational, or fictive, temperature which may differ from its actual temperature. The fictive temperature is the temperature at which the glass structure would have been the equilibrium structure. It describes the structure of a glass as it relates to the cooling rate. A fast-quenched glass would have a higher fictive temperature than a slowly cooled glass. Fictive temperature is indicative of the randomness in the arrangement of atoms within the glass, and is proportional to the amount of Raleigh scattering in an optical fiber. Specifically, the Rayleigh scattering intensity decreases as the fictive temperature $T_f$ within glass becomes lower (randomness is reduced). Therefore, a reduction in fictive temperature will result in a reduction in the transmission loss of the optical fiber. The viscosity of silica glass at $T_g$ is generally taken to be between $10^{13}$ poise and $10^{13.6}$ poise.

Figure 3:
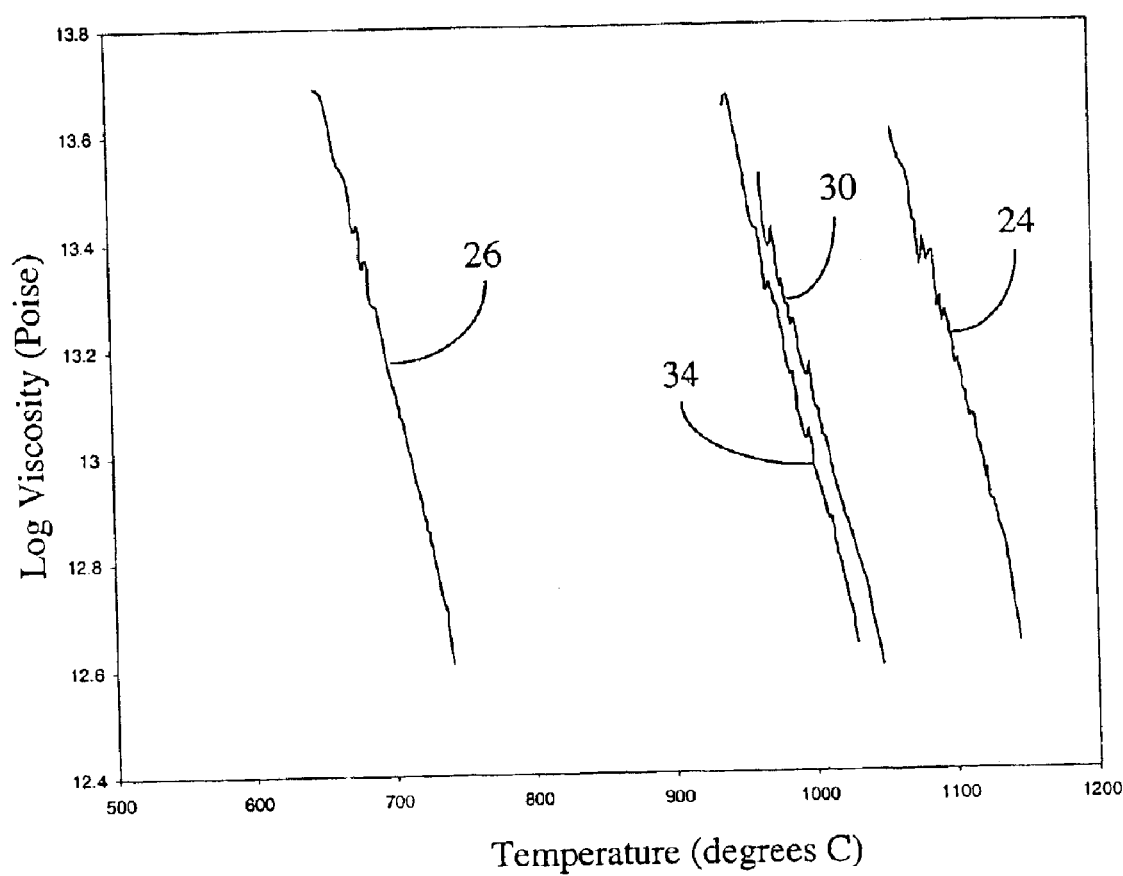
FIG. 3 is an illustration of viscosity vs. temperature for silica glass containing example amounts of F or Cl dopant.

FIG. 3 displays measured viscosity/temperature curves for silica glass doped with F or Cl. The addition of a dopant to silica glass will generally reduce the viscosity of the glass. As evidenced by FIG. 3, any given point on a viscosity/temperature curve for silica glass is reduced (shifted) when a dopant is introduced into the silica glass. For convenience, a reference viscosity point may be chosen to be the viscosity of the glass at its glass transition temperature $T_g$, although it should be clear to the skilled artisan that other reference viscosities may be used. A viscosity of $10^{13.6}$ poise is used as the reference viscosity $T_g$ herein.

Figure 4:
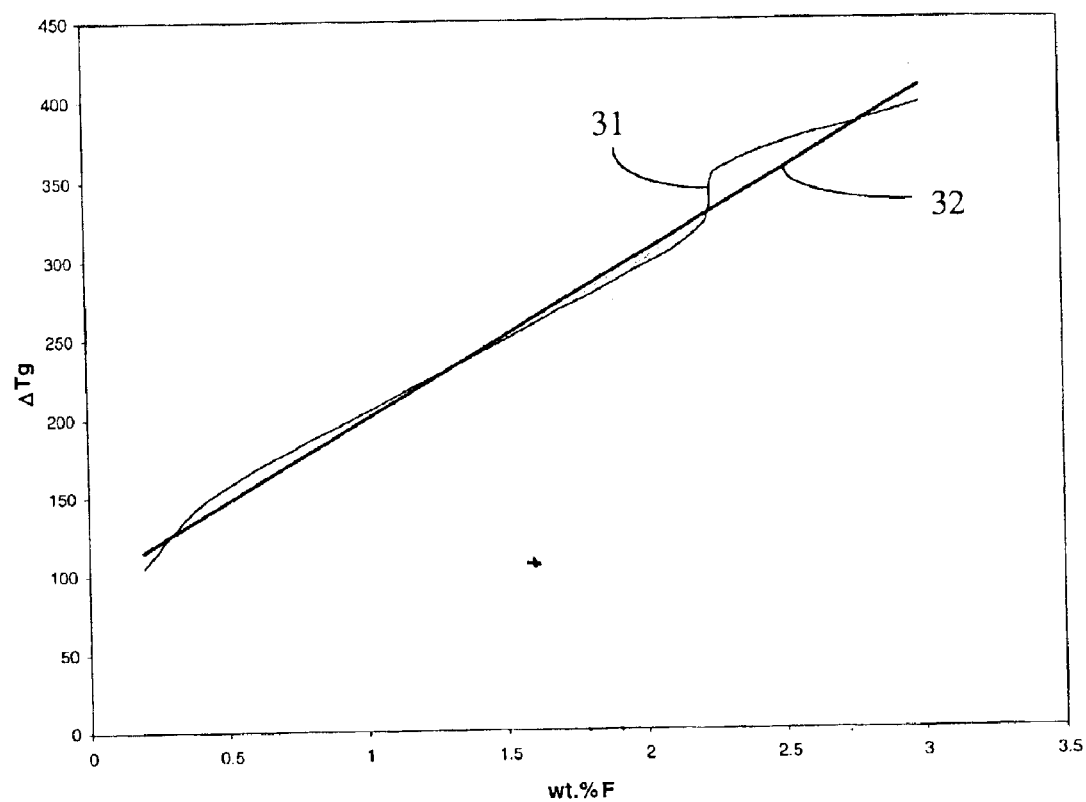
FIG. 4 is a plot of the change in $T_g$ as a function of wt. % F for silica glass.

Referring again to FIG. 3, doping silica glass with about 3 weight percent (wt. %) F will reduce $T_g$ by about 400° C. as indicated by the temperature difference between curve 24, representing viscosity vs. temperature for pure silica, and curve 26, representing viscosity vs. temperature for silica glass doped with about 3 wt. % F. As another example, doping silica glass with about 0.2 wt. % F will reduce $T_g$ by about 100° C. as shown by comparing curve 24 with curve 30, where curve 30 represents viscosity vs. temperature for silica glass doped with about 0.2 wt. % F. Thus, it should be noted that the change in the $T_g$ for silica glass resulting from the addition of F is not constant. That is, whereas the change in $T_g$ resulting from 3 wt. % F is about 100° C., the change in $T_g$ ($\Delta T_g$) resulting from 3 wt. % F is only about 400° C. The relationship between the change in $T_g$ and wt. % F for silica glass was determined experimentally, as is shown by curve 31 in FIG. 4, and is further represented by fitted curve 32 in FIG. 4. Curve 34 is approximated by the equation $$T_{gF} = 104*[F] + 94 \qquad (2)$$

where $T_{gF}$ is the change in the glass transition temperature of silica glass, when doped with F, in ° C. and [F] is the wt. % of F.

To offset the change in refractive index that occurs by adding F to the core while at the same time further reducing the viscosity of the core, Cl is added to the core region. About 1 wt. % Cl would be required to reduce the Tg of silica glass about 100° C. This is evident by comparing the temperature difference between curve 24 and curve 34 in FIG. 3, where curve 34 represents the viscosity vs. temperature curve for silica glass containing about 1 wt. % Cl. The change in $T_g$ for a given wt. % Cl is assumed to be constant.

While F and Cl both reduce the $T_g$ of silica glass, F has a much greater effect for a given wt. %. F will also affect the refractive index of the glass differently than Cl. Doping silica glass with F will decrease the refractive index of the glass. Doping silica glass with Cl will increase the refractive index of the glass. One weight percent chlorine will raise the relative refractive index (% $\Delta$) of silica glass by about 0.08%, whereas 1 wt. % F will reduce the relative refractive index of silica by about 0.27%. Thus, the change in the refractive index of the core region due to the addition of F can be partially offset by also doping the core with Cl. For example, the core relative refractive index % $\Delta_{12}$, relative to the adjacent cladding segment, for a single-mode step index, matched clad optical fiber optimized for operation in the 1300 nm window (1300–1400 nm), such as a conventional pure silica core fiber, is about 0.35%. This relative refractive index is attained by doping the cladding segment with about 1.3 wt. % F. The resulting change in $T_g$ for the cladding segment is about −260° C., relative to the pure silica core region. Doping the core region of the optical fiber with an appropriate amount of F and Cl can adjust the glass transition temperature of the core region $T_{g1}$ to be within a desired range of the cladding glass transition temperature $T_{g2}$. Preferably the core region is doped with F and Cl in an amount effective to yield a difference between $T_{g1}$ and $T_{g2}$ preferably less than about 200° C., more preferably less than about 150° C., and most preferably less than about 100° C. Table 1, infra, provides examples of suitable amounts of F and Cl that can be added to the core region of an optical fiber to attain a desired difference in $T_g$ between the core and the cladding. In Table 1, the cladding is assumed to be doped with F, $\Delta T_{g12}$ represents the predicted absolute difference in $T_g$ between the core region and the adjacent cladding segment, and % $\Delta_{12}$ represents the predicted core region relative refractive index, relative to the adjacent cladding segment. Also, [F] represents the amount of F to be added to the core or cladding region (as indicated), in wt. %, and [Cl] represents the amount of Cl to be added to the core region, in wt. %.

TABLE 1

| [F] (wt. %) Core | [Cl] (wt. %) Core | Ratio (F:Cl) | [F] (wt. %) Clad | $\Delta T_{g12}$ (° C.) | % $\Delta_{12}$ (%) |
| --- | --- | --- | --- | --- | --- |
| 2.04 | 0.51 | 4:1 | 3 | 92.6 | 0.3 |
| 1.33 | 0.44 | 3:1 | 2.5 | 138.3 | 0.351 |
| 0.6 | 0.3 | 2:1 | 2 | 199.1 | 0.402 |
| 0.8 | 0.2 | 4:1 | 2 | 100.3 | 0.34 |
| 1.2 | 2.4 | 1:2 | 3 | 147.8 | 0.3 |
| 0.47 | 0.94 | 1:2 | 3 | 183.3 | 0.38 |
| 0.66 | 1.98 | 1:3 | 2 | 98.8 | 0.52 |
| 0.1 | 0.3 | 1:3 | 2 | 147.4 | 0.537 |
| 0.34 | 0.11 | 3:1 | 1.6 | 199.9 | 0.349 |

Because the core region of the optical fiber according to the present invention lacks appreciable Ge, a higher % $\Delta_{12}$ can be achieved for the core region without the high scattering losses that accompany high concentrations of Ge (e.g. concentrations higher than about 7 wt. %).

Preferably the core region of the optical fiber according to the present invention is doped with F in an amount between about 0.1 wt. % and 2 wt. %, more preferably between about 0.4 wt. % and 1.5 wt. %, and most preferably between about 0.5 wt. % and 1 wt. %. Preferably the core region is doped with Cl in an amount between about 0.1 wt. % and 3 wt. %, more preferably between about 0.5 wt. % and 2.5 wt. %, and most preferably between about 0.5 wt. % and 2 wt. %. For some optical fiber designs it may be desirable to minimize the amount of F in the cladding, which would then require a minimal change in % $\Delta_1$ from pure silica (i.e. maintain % $\Delta_1$ as small as possible). This requires balancing the change in % $\Delta_1$ due to the addition of F with the change in % $\Delta 1$ due to the addition of Cl. This can be accomplished by setting the ratio of the amount of F to the amount of Cl to preferably between about 1:2 and 1:4, and more preferably at about 1:3. Preferably % $\Delta_{12}$ in accordance with the present invention is between about 0.30% and 0.54%.

As with other single-mode optical fibers having a zero dispersion wavelength in the 1310 nm operating window, the optical fiber according to the present invention is expected to have an attenuation at a wavelength of 1550 nm less than about 0.25 dB/km, more preferably less than about 0.21 dB/km, and most preferably less than about 0.18 dB/km. The optical fiber will have a mode field diameter at a wavelength of 1550 nm between 8 µm and 12 µm, and an effective area between about 70 µm² and 100 µm². In addition, the optical fiber should have a total dispersion between about 16 ps/nm/km and 20 ps/nm/km at a wavelength of 1550 nm, with a dispersion slope of between 0.05 ps/nm2/km and 0.07 ps/nm2/km also at a wavelength of 1550 nm.

Doping of the optical fiber of the present invention may be performed in any manner known to those skilled in the art. For example, any portion of an optical fiber preform can be doped with F and Cl by forming that portion as a porous coating or structure which is thereafter subjected to a F and Cl-containing atmosphere at an elevated temperature prior to the completion of the consolidation process which converts the porous coating or structure to a solid glass coating or structure. An example of such a method is illustrated in FIGS. 5 through 9 and 11–12.

Figures 5, 6:
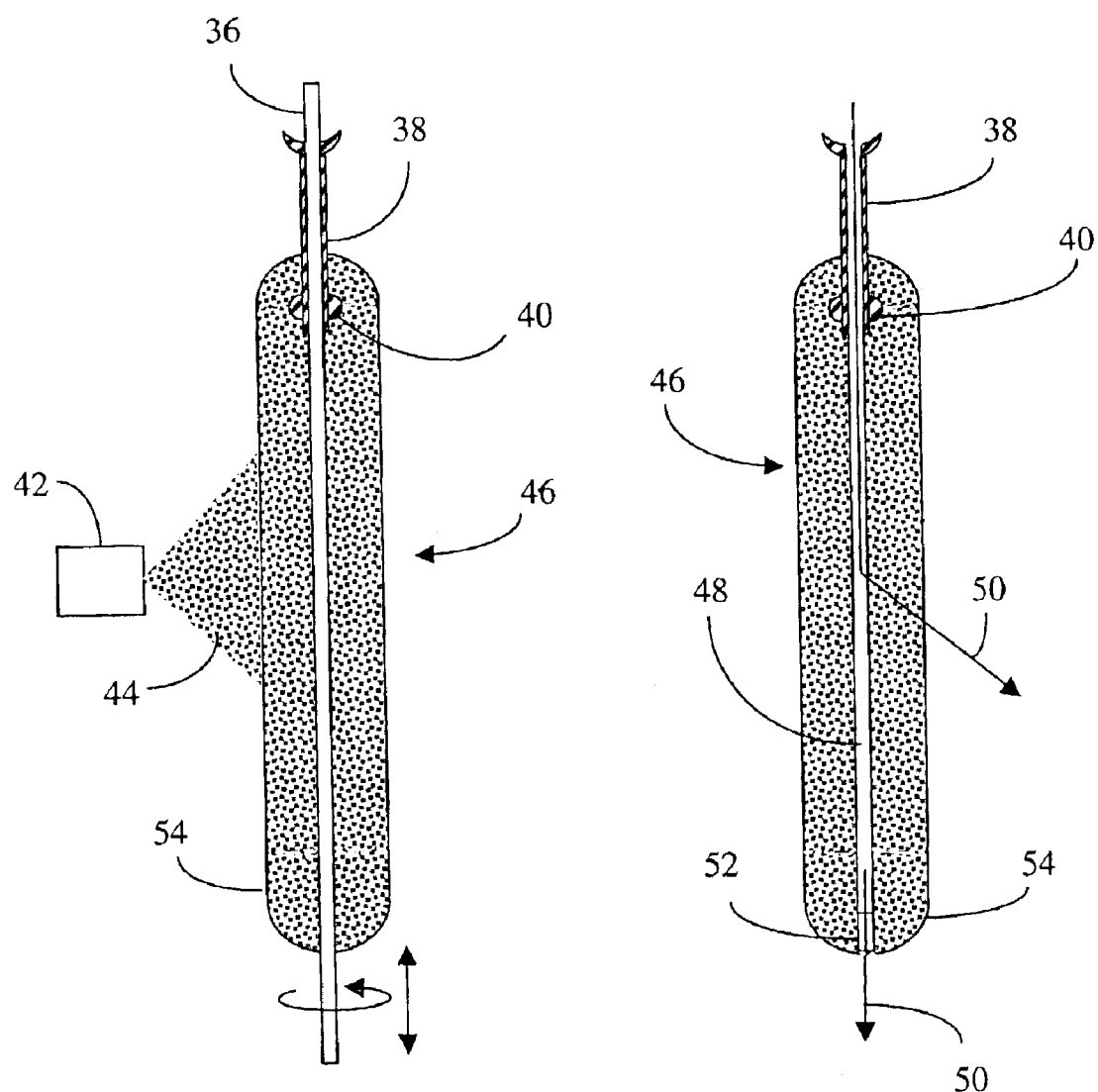
FIG. 5 illustrates the application of a coating of glass soot to a mandrel.
FIG. 6 is a schematic illustating drying and doping a porous glass preform.

A circularly symmetric porous preform may be formed in accordance with the method illustrated in FIG. 5. In the embodiment shown in FIG. 5, an optical fiber core preform is formed by a method similar to that disclosed in U.S. Pat. No. 4,486,212 (Berkey). Referring to FIG. 5, the large diameter end of a tapered mandrel 36 is inserted into glass tube 38, hereinafter referred to as handle 38, having annular protrusion 40. Shims (not shown) can be used to secure handle 38 to mandrel 36 as disclosed in U.S. Pat. No. 4,289,517. The mandrel may be provided with a layer of carbon soot to facilitate removal of the soot preform. Mandrel 36 is rotated and translated with respect to a burner 42 of the type disclosed in U.S. Pat. No. 4,165,223. Fuel gas and oxygen or air are supplied to burner 42 from a source (not shown). This mixture is burned to produce a flame which is emitted from burner 42. A gas-vapor mixture is oxidized within the flame to form a soot stream 44 which is directed toward mandrel 36. Suitable means for delivering the gas-vapor mixture to burner 42 are well known in the art; for an illustration of such means reference is made to U.S. Pat. Nos. 3,826,560, 4,148,621 and 4,173,305. One or more auxiliary burners (not shown) may be employed to direct a flame toward one or both ends of the porous soot preform during deposition to prevent breakage; the use of auxiliary burners is taught in U.S. Pat. No. 4,810,276 (Gilliland).

Burner 42 is generally operated under conditions that will provide acceptably high laydown rates and efficiency while minimizing the buildup of soot on the face thereof. Under such conditions, the flow rates of gases and reactants from the burner orifices and the sizes and locations of such orifices as well as the axial orientation thereof are such that a well focused stream of soot flows from burner 42 toward mandrel 36. In addition, a cylindrical shield (not shown) which is spaced a short distance from the burner face, protects the soot stream from ambient air currents and improves laminar flow. Porous soot core preform 46 is formed by traversing mandrel 36 many times with respect to burner 42 to cause a build-up of many layers of silica soot. The translating motion could also be achieved by moving burner 42 back and forth along rotating mandrel 36 or by the combined translational motion of both burner 42 and mandrel 36. The core preform may contain only core glass, or alternatively, the core preform may contain at least a portion of the cladding glass. After the deposition of soot core preform 46, mandrel 36 is pulled therefrom, and the mandrel is removed through handle 38, thereby leaving a longitudinal aperture 48 in the porous preform, as shown in FIG. 6, through which drying and/or doping gas 50 may be flowed. Protrusion 40 causes preform 46 to adhere to handle 38; handle 38 supports preform 46 during subsequent processing. Typically, the drying gas is $Cl_2$. However, $SiCl_4$ is also a satisfactory drying gas, and the use of $SiCl_4$ advantageously results in an increased amount of Cl being retained within the preform as a dopant. Therefore, although $Cl_2$ is preferred as a drying gas, a more preferable choice is $SiCl_4$.

Figure 7:
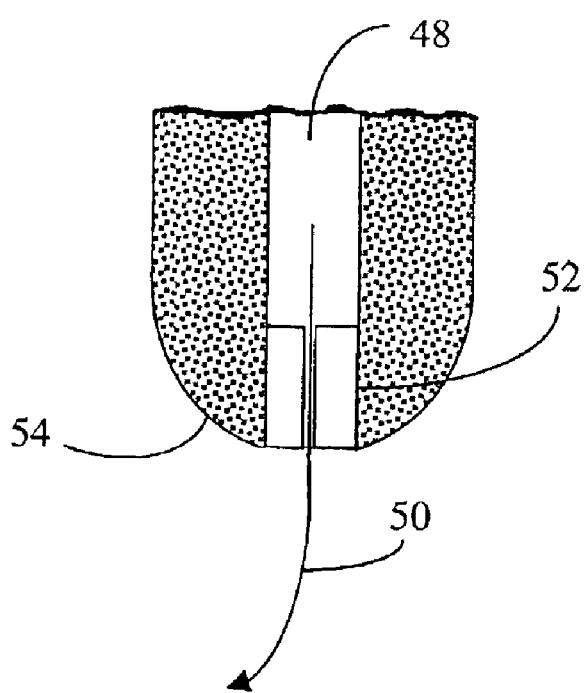
FIG. 7 is a detailed view of one end of a porous glass preform.

Drying and doping of the core preform with Cl and F can be facilitated by inserting a short section of capillary tube 52 into that end 54 of the porous preform aperture opposite handle 38. The drying gas 50 is flowed through handle 38 into aperture 48 and out through capillary tube 52. Capillary tube 52 initially permits some of the drying gas to flush water from the central region of the preform. As the porous preform is inserted into a consolidation furnace, the capillary tube aperture closes, thereby causing all drying and/or doping gases to thereafter flow through the preform interstices. A detail of end 54 is shown in FIG. 7.

Once drying and/or Cl-doping of the core preform has been completed, a F-containing gas is introduced through handle 38 into aperture 48 such that both the drying and/or Cl-doping gas and the F-containing gas flow simultaneously.

Any suitable compound such as $C_2F_6$, $C_2F_2Cl_2$, $CF_4$, $SiF_4$ and $SF_6$ may be employed to provide the F. By taking suitable precautions which are known in the art, fluorine gas ($F_2$) can be used. The Cl- and F-containing gases may also be introduced into the consolidation furnace such that the gases may penetrate the core preform through the exterior surface of the preform. As the Cl- and F-containing gases flow, consolidation of the core preform is begun by driving the preform into the hot zone of the consolidation furnace. Examples of a suitable consolidation furnace are disclosed in U.S. Pat. Nos. 4,165,223 and 4,741,748. The scanning consolidation furnace disclosed in U.S. Pat. No. 4,741,748 is advantageous in that one source of heat in the preform is generated by a coil that scans along the preform. A sharp hot zone can be generated by slowly traversing the coil along the preform; alternatively, the preform can be isothermally heated by rapidly reciprocating the coil. Moreover, the temperature of a scanning consolidation furnace is readily adjustable. Consolidation, or sintering, of the core preform as the Cl- and F-containing gases continue to flow aids in the retention of the Cl and F dopants in the core preform.

Figure 8:
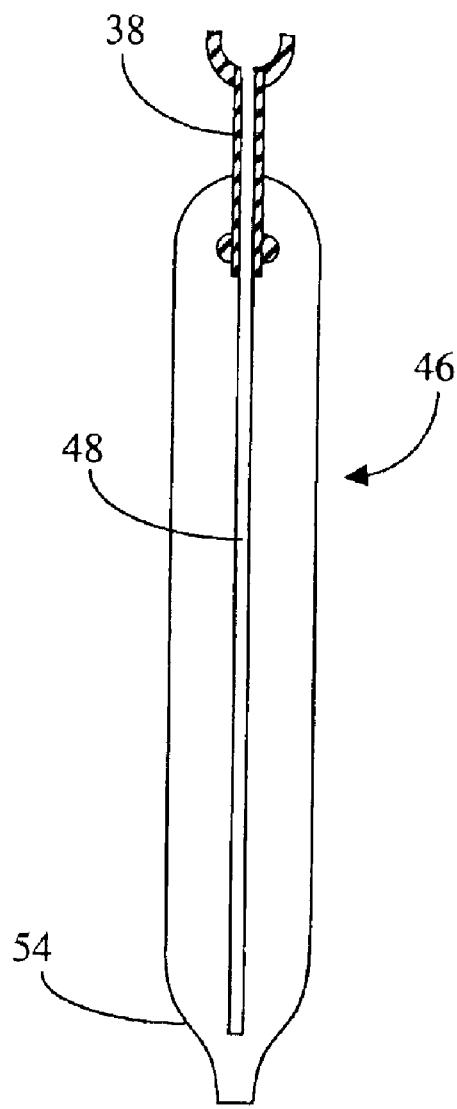
FIG. 8 is a cross-sectional view of a consolidated glass preform.

After consolidation, the consolidated core preform aperture 48 will be closed at end 54 as shown in FIG. 8 due to the presence of capillary plug 52. If no plug is employed the entire aperture will remain open. In this event end 54 is closed after consolidation by a technique such as heating and pinching the same.

For certain soot compositions including pure silica, conventional soot deposition techniques result in the formation of a devitrified layer on the aperture-forming surface of the resultant glass preform during the consolidation process. If such a devitrified layer exists in the preform, it should be removed by etching to prevent the formation of seeds in the resultant fiber. If the capillary tube aperture closes during consolidation, end 54 must be severed to permit an acid wash to flow freely through aperture 48 in order to effectively remove the devitrified layer. Thereafter, the aperture is rinsed and dried, and end 54 is heated and sealed.

A preferred method of forming a silica soot preform, which is disclosed in U.S. Pat. No. 4,453,961, prevents devitrification of the aperture-forming surface during consolidation. That method comprises depositing the first plurality of layers of glass soot on the mandrel at a deposition rate that is sufficiently low that no spiral pattern of deposited soot is visible. The deposition of a fine, spiral-free coating on mandrel 36 can be accomplished by supplying burner 42 with a greatly reduced flow of reactant. The absence of a high velocity reactant vapor stream emanating from the burner tends to generate a defocused soot stream 44 that is incapable of depositing a coating of soot having a sufficient density variation to appear as a spiral. After many layers are deposited, the fine soot stream becomes continuous.

After the unfocused soot stream has been employed for a time sufficient to build up a continuous layer, the flow of reactants to the burner is increased to a conventional rate, and the remainder of preform 46 is deposited at a normal high deposition rate.

Consolidated core preform 46 of FIG. 8, which forms the core region of the resultant fiber, is etched to remove a thin surface layer. The core preform is then stretched into an intermediate, large diameter fiber, or core cane, which is thereafter provided with fluorine-doped cladding.

Figure 9:
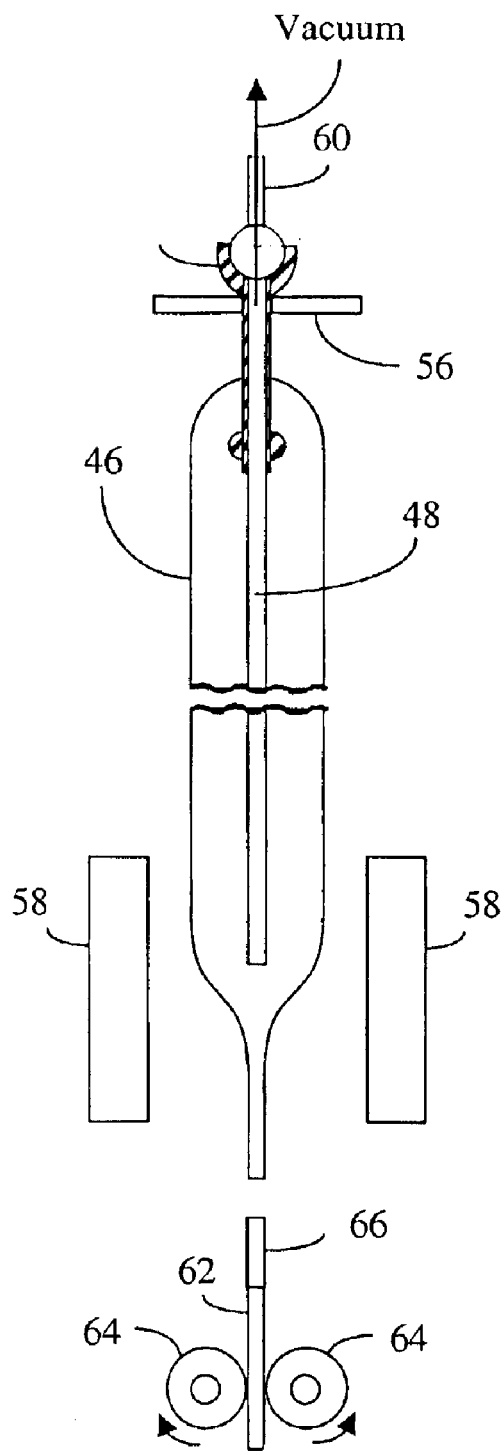
FIG. 9 is a schematic diagram illustrating the drawing of a core cane from a consolidated glass preform.

The core cane can be formed in a conventional draw furnace wherein the tip of the consolidated preform from which the core cane is being drawn is heated to a temperature which is slightly lower than the temperature to which the preform would be subjected to draw optical fiber therefrom. A temperature of about 1900° C. is suitable for a silica preform. A suitable method for forming a core cane is illustrated in FIG. 9. Preform 46 is mounted in a conventional draw furnace by yoke 56, within which handle 38 is seated, and where the tip thereof is heated by resistance heater 58. A vacuum connection 60 is attached to handle 38, and preform aperture 48 is evacuated. A glass rod 62, which is attached to the bottom of preform 46, is pulled by motor-driven tractors 64, thereby causing the core cane 66 to be drawn at a suitable rate. A rate of 15 to 23 cm/min has been found to be adequate. As the core cane is drawn, aperture 48 readily closes since the pressure therein is low relative to ambient pressure. The diameter of a core cane that is to be employed as a mandrel upon which cladding soot is to be deposited is preferably in the range of 4 to 10 mm.

Figure 10:
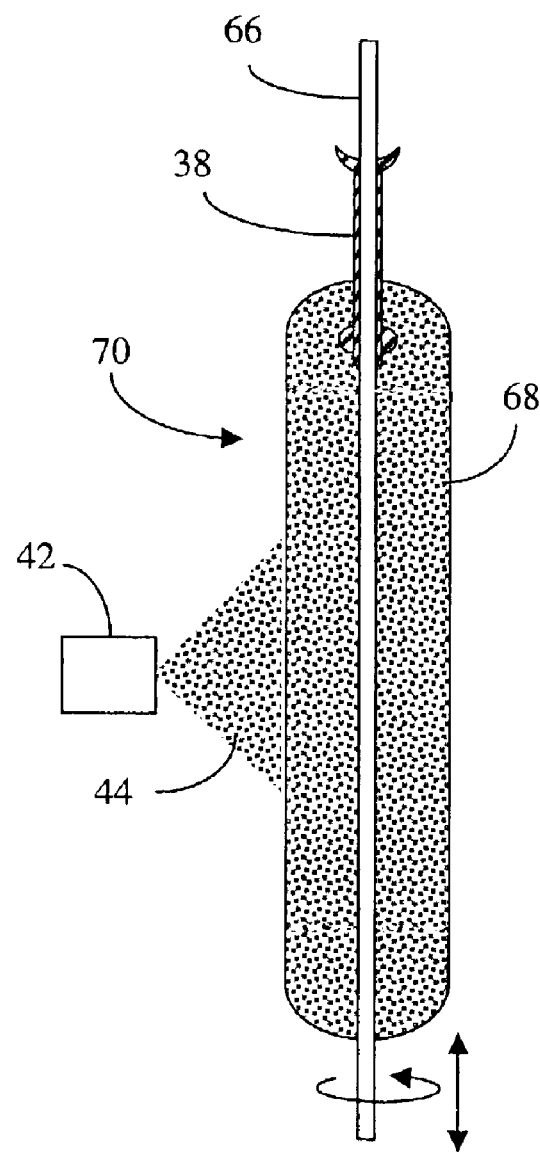
FIG. 10 illustrates the application of a coating of glass cladding soot to a core cane.

Core cane 66 is mounted in a lathe where it is rotated and translated with respect to burner 42 as shown in FIG. 10. A porous coating 68 of silica soot is built up on the surface of core cane 66 to form a composite preform 70. Coating 68 forms at least a portion of the cladding of the optical fiber. In accordance with the method of the present invention, fluorine is added to porous silica coating 68 during consolidation of that coating.

Figure 11:
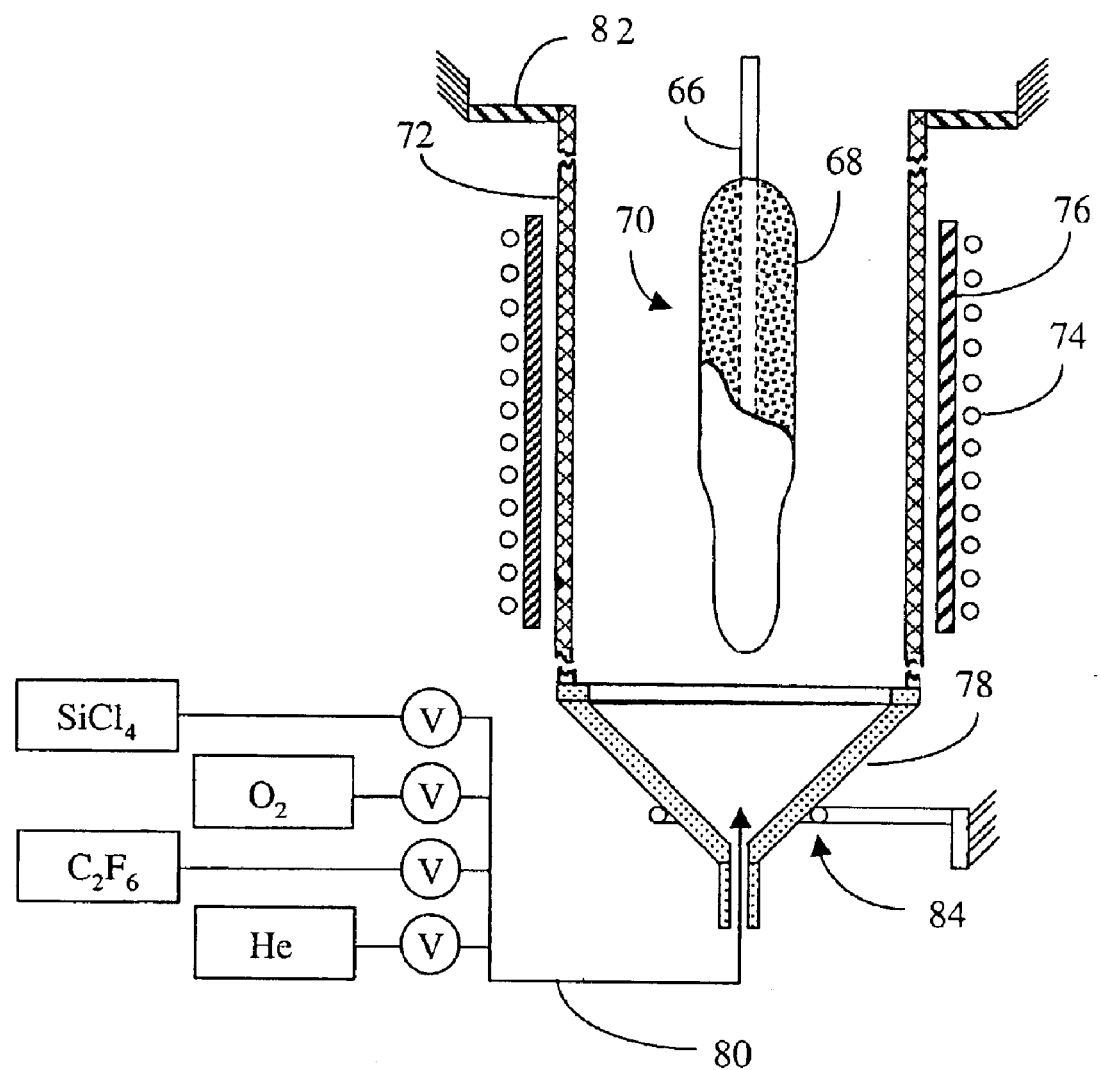
FIG. 11 is a schematic representation of a consolidation furnace and consolidation atmosphere system.

During consolidation of the cladding coating, the porous cladding 68 is doped with at least F and sintered in a consolidation furnace. A typical consolidation furnace is illustrated in FIG. 11. A high silica content muffle 72 is separated from heating elements 74 by a tubular, high silica content liner 76. The term "high silica content" as used herein means pure fused silica or a high silica content glass such as a borosilicate glass. Porous silica coating 68 would conventionally be consolidated at 1470° C. However, the diffusion of F into the silica during the consolidation process enables consolidation to be performed at lower temperatures. For example, doping the cladding region with about 1 wt. % F enables consolidation to be performed at about 1400° C. Higher concentrations of F in the porous cladding glass would enable it to be consolidated at even lower temperatures. High silica content glass muffle 72 can be employed because of this relatively low consolidation temperature. Liner 76 surrounds muffle 72 in the vicinity of heating elements 74 to protect muffle 72 from refractory particles emanating from the furnace bricks (not shown) which surround the heating elements.

Furnace gases 80, including one or more doping gases, are fed to the bottom of muffle 72 through a conical section 78 which is affixed thereto. Silica muffle 72 is supported at its upper end by a ring 82 to provide additional support for the middle section thereof which tends to sag at consolidation temperature. Conical section 78 is supported by ringstand 84.

The furnace gases 80 may contain helium and oxygen and an amount of Cl sufficient to remove hydroxyl ions from the porous preform. In accordance with the method of the present invention, F is also supplied to the bottom of muffle 72. Any suitable compound such as $C_2F_6$, $C_2F_2Cl_2$, $CF_4$, $SiF_4$ and $SF_6$ may be employed. By taking suitable precautions which are known in the art, fluorine gas ($F_2$) can be used.

Preferably, the consolidated optical fiber preform according to the present invention is drawn into an optical fiber at a speed greater than about 2 meters per second, more preferably greater than about 5 meters per second, and most preferably greater than about 9 meters per second.

Figure 12:
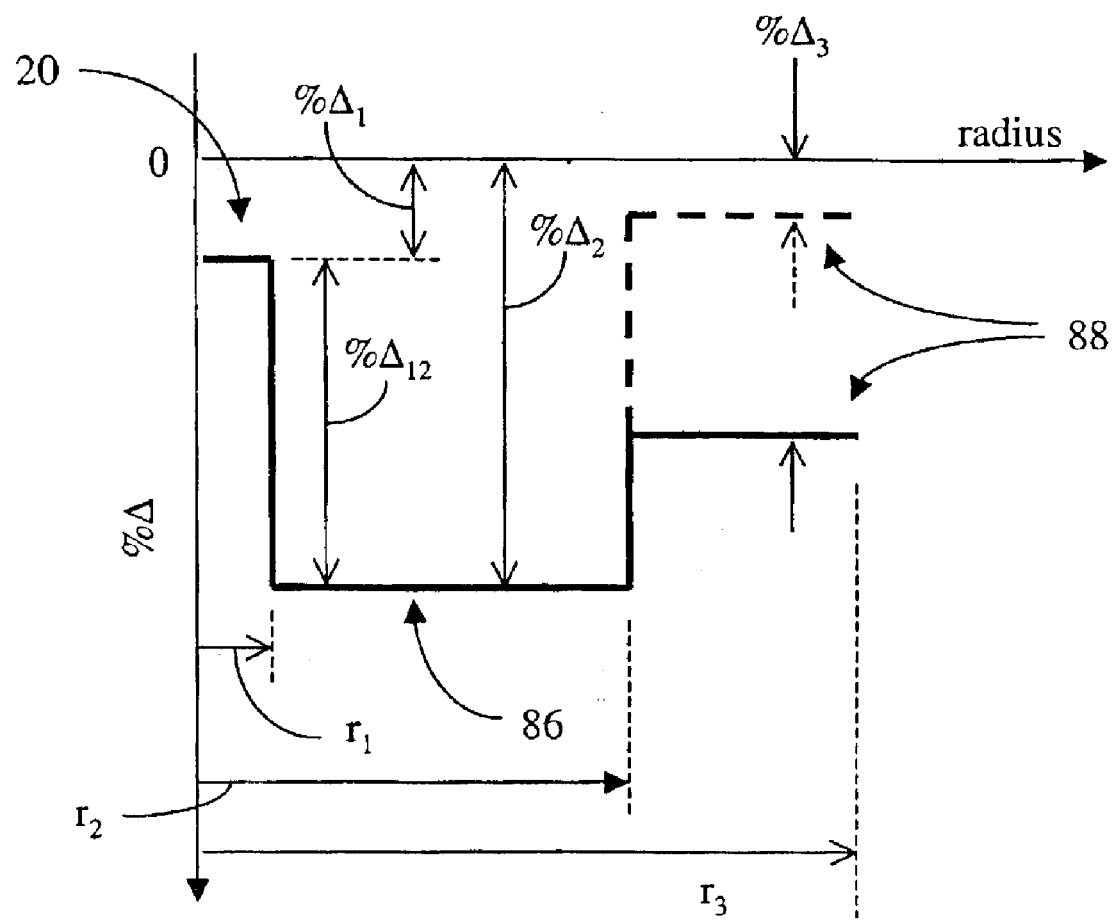
FIG. 12 is an illustration of a refractive index profile according to another embodiment of the present invention.

In another embodiment according to the present invention, and as depicted in FIG. 12, an optical fiber is comprised of a core region 20 having a radius $r_1$, a maximum index of refraction $n_1$ ($n_1<n_0$), a relative refractive index % $\Delta_1$, a negative relative refractive index % $\Delta_{12}$ with respect to the adjacent cladding segment, and a glass transition temperature $T_{g1}$. The optical fiber is further comprised of a cladding region having an inner cladding segment 86 and an outer cladding segment 88, wherein the inner cladding segment 86 is doped with a dopant to reduce the refractive index of the segment. The inner cladding segment 86 is disposed about and in contact with the core region 20, and has a radius $r_2$, a minimum refractive index $n_2$ ($n_2<n_1$), a negative relative refractive index % $\Delta_2$ with respect to pure silica, and a glass transition temperature $T_{g2}$. Preferably the inner cladding segment 86 is doped with F. The outer cladding segment 88 is disposed about and in contact with the inner cladding segment 86, and has a radius $r_3$, a maximum refractive index $n_3$ ($n_0 \geq n_3 > n_2$), a negative relative refractive index % $\Delta_3$ with respect to pure silica, and a glass transition temperature $T_{g3}$. Preferably, the outer cladding segment 88 is doped with a dopant such that % $\Delta_3$ is less negative than % $\Delta_2$, and $|\% \Delta_3| < |\% \Delta_1| < |\% \Delta_2|$, as represented by the dashed line at 88, and more preferably $|\% \Delta_1| < |\% \Delta_3| < |\% \Delta_2|$, as represented by the solid line at 88.

The core region of the optical fiber of the present embodiment is pure silica glass doped with F and Cl in an amount effective to yield a difference between $T_{g1}$ and $T_{g2}$ preferably less than about 200° C., more preferably less than about 150° C., and most preferably less than about 100° C. Preferably the core region of the optical fiber is doped with F in an amount between about 0.1 wt. % and 1.3 wt. %, more preferably between about 0.2 wt. % and 1 wt. %, and most preferably between about 0.5 wt. % and 1 wt. %. Preferably the core region is doped with Cl in an amount between about 0.1 wt. % and 3 wt. %, more preferably between about 0.5 wt. % and 3 wt. %, and most preferably between about 0.5 wt. % and 2.5 wt. %. Preferably the ratio of the concentration of fluorine to the concentration of chlorine is between about 1:2 and 1:4, and more preferably between about 1:2.5 and 1:3.5. Preferably % $\Delta_{12}$ in accordance with the embodiment is between about 0.30% and 0.54%, more preferably between about 0.32% and 0.38%, and most preferably between about 0.34% and 0.36%.

Figure 13:
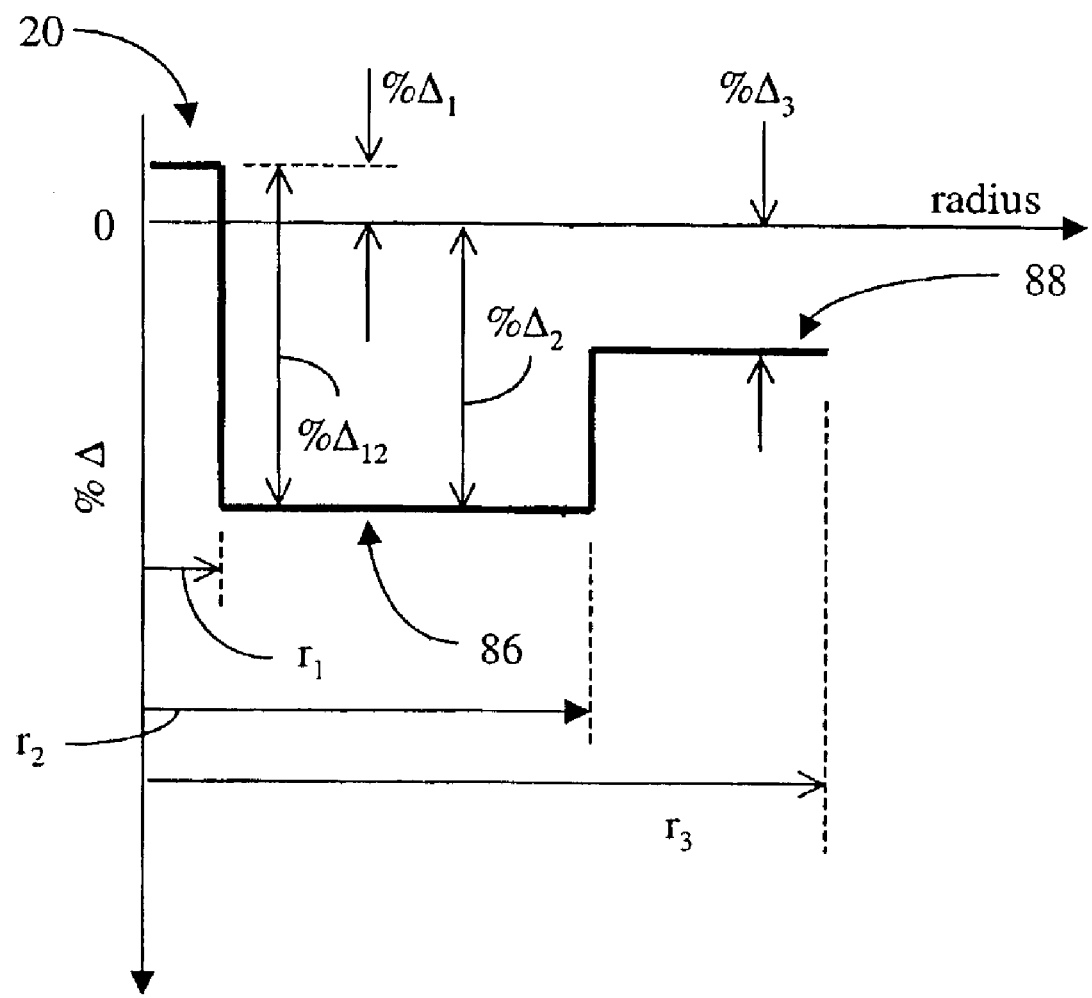
FIG. 13 is an illustration of a refractive index profile of an optical fiber according to another embodiment of the present invention.

In yet another embodiment, illustrated in FIG. 13, an optical fiber is comprised of a core region having a radius $r_1$, a maximum index of refraction $n_1$ ($n_1<n_0$), a positive relative refractive index % $\Delta_1$, a relative refractive index % $\Delta_{12}$ with respect to the innermost cladding segment, and a glass transition temperature $T_{g1}$. The optical fiber is further comprised of a cladding region having an inner cladding segment adjacent to the core region and an outer cladding segment, wherein the inner cladding segment is doped with a dopant to reduce the refractive index of the segment. The inner cladding segment is disposed about and in contact with the core region, and has a radius $r_2$, a minimum refractive index $n_2$ ($n_2<n_1$), a negative relative refractive index % $\Delta_2$, and a glass transition temperature $T_{g2}$. Preferably the inner cladding segment is doped with F. The outer cladding segment is disposed about and in contact with the inner cladding segment, and has a radius $r_3$, a maximum refractive index $n_3$ ($n_0 \geq n_3 > n_2$), a negative relative refractive index % $\Delta_3$ and a glass transition temperature $T_{g3}$. The optical fiber of this embodiment has a positive % $\Delta_1$, a negative % $\Delta_2$, a negative % $\Delta_3$, and $|\% \Delta_3| < |\% \Delta_2|$. Doping levels for the core region would be consistent with the doping levels of the previous embodiments.

As stated, the allowable mismatch between core and cladding is a function of fiber design and purpose. Some fiber designs may be more or less sensitive to differences in $T_g$ between the core region and the cladding region. Although the discussion supra has centered around optical fibers having a predominantly silica core, the addition of Cl and F in the core region is effective for more complex optical fiber designs as well, including optical fibers having multi-segment core regions.

EXAMPLES

Example 1

The following specific example illustrates the manner in which the method of the present embodiment can be employed to produce a single-mode optical waveguide fiber having a silica core doped with Cl and F, and a fluorine-doped silica cladding. An integral handle 38 of the type disclosed in U.S. Pat. No. 4,289,522 is employed. An alumina mandrel 36 was inserted into handle 38, the central region where soot particles are ultimately deposited being tapered in diameter from about 5.5 mm to 6.5 mm.

Liquid $SiCl_4$ was maintained at 37° C. in a container. Burner 42 traversed a 49 cm section of mandrel 36 in 25 seconds. An acetylene torch supported on burner 42 was first employed to deposit carbon particles on mandrel 36 during one burner pass. During the next 30 minutes, oxygen was flowed at a rate of 0.05 slpm through a $SiCl_4$ container, the resultant mixture flowing to the burner. The resultant fine soot stream formed a layer of silica soot having a thickness of about 1 mm. During the next 6.5 hours, the flow rate of oxygen to the $SiCl_4$ container was increased to 1.4 slpm during which time silica soot was deposited to form a soot preform, the outer diameter of which was 70 mm.

The soot core preform 46 was removed from the lathe, and mandrel 36 was removed therefrom, the integral handle 38 remaining at one end thereof. A short section of capillary tube 52 was inserted into that end of preform aperture 48 opposite handle 38. Core preform 46 was then simultaneously dried and consolidated in accordance with the teachings of U.S. Pat. No. 4,125,388. A drying gas consisting of 5 volume percent $Cl_2$, the balance being helium, was flowed through handle 38 and into core preform aperture 48. A portion of this drying gas initially flowed through an aperture in capillary tube 52, carrying with it water vapor along with reaction products from the drying reaction. As core preform 46 was lowered into the consolidation furnace, through which a helium flushing gas was flowing, the aperture 53 in capillary tube 52 became sealed, and the core preform was subjected to gradient consolidation.

Preform 46 was consolidated at a peak temperature of about 1450 C. During the consolidation process, a mixture comprising 50 vol. % $Cl_2$ and 4 vol. % $CF_4$ was flowed within the consolidation furnace. Core preform 46 was subjected to a 6 mm/min down drive into the consolidation furnace.

Once core preform 46 had been consolidated, a silica rod 62 was fused to the tip of the consolidated preform which was then inserted into a draw furnace. The preform aperture 48 was evacuated by affixing vacuum connection 60 to the end of handle 38. The preform was heated to about 1900° C. and pulled downwardly at a rate of about 15 cm/mm. The diameter of the resultant core cane 66 was about 5 mm. After the core cane was drawn to a length of about 91 cm, it was broken from the preform.

Core cane 66 was supported in a lathe where it functioned as a mandrel for the deposition of cladding soot. Oxygen was flowed through a $SiCl_4$ container at a rate of 1.6 slpm and burned in burner 42 to produce $SiO_2$ soot. Burner 42 traversed the core cane at a rate of about 2 cm/sec. This was continued until a layer of $SiO_2$ was deposited to form a porous soot clad preform 68 having an outside diameter of about 60 mm.

The porous soot clad preform was placed in consolidation furnace of FIG. 11 to be dried, doped with F, and consolidated. Furnace muffle 72 consisted of a 152 cm long silica cylinder having an inner diameter of 14.6 cm and an outer diameter of 15.2 cm. A 61 cm long silica liner 76 having an inner diameter of 18.1 cm and an outer diameter of 18.7 cm separated muffle 72 from heating elements 74. The porous soot clad preform was first dried. During the drying phase, a gas mixture comprising 2 vol. % $Cl_2$ was flowed through the consolidation furnace. The peak temperature of the furnace, as measured at the outside of the silica liner, was 1450° C. The preform next underwent doping and consolidation by driving the preform into the furnace at about 12 mm/min while simultaneously flowing 5 standard liters per minute (slpm) $SiF_4$ and 12.25 slpm He into the bottom of muffle 72.

The resultant consolidated optical fiber preform, the diameter of which was about 35 mm, was inserted into a draw furnace where the tip thereof was subjected to a temperature of about 2100° C. The preform was drawn at a draw rate of 3 meter per second to form a step-index, single-mode optical waveguide fiber having a core diameter of about 8 $\mu$m.

Figure 14:
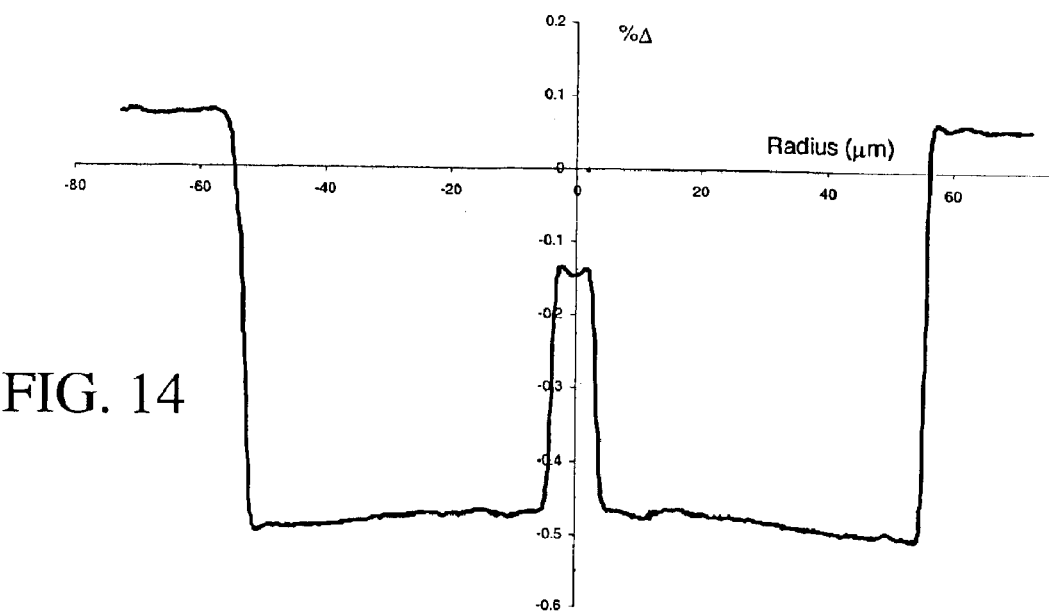
FIG. 14 depicts a refractive index profile of an optical fiber according to the present invention.

The refractive near field (RNF) of the optical fiber was measured, and produced the plot shown in FIG. 14. The cladding region of the optical fiber had a single segment doped with about 1.8 wt. % F, a relative refractive index % $\Delta_2$=−0.48%, and a glass transition temperature $T_{g2}$ calculated to be reduced by approximately 282° C. relative to pure silica. The core region of the optical fiber preform was doped with about 0.2 wt. % Cl and about 0.6 wt. % F. The glass transition temperature of the core region relative to pure silica $T_{g1}$ was calculated to have been reduced by about 175° C. The expected difference between $T_{g1}$ and $T_{g2}$ was calculated to be 107° C.

Example 2

Figure 15:
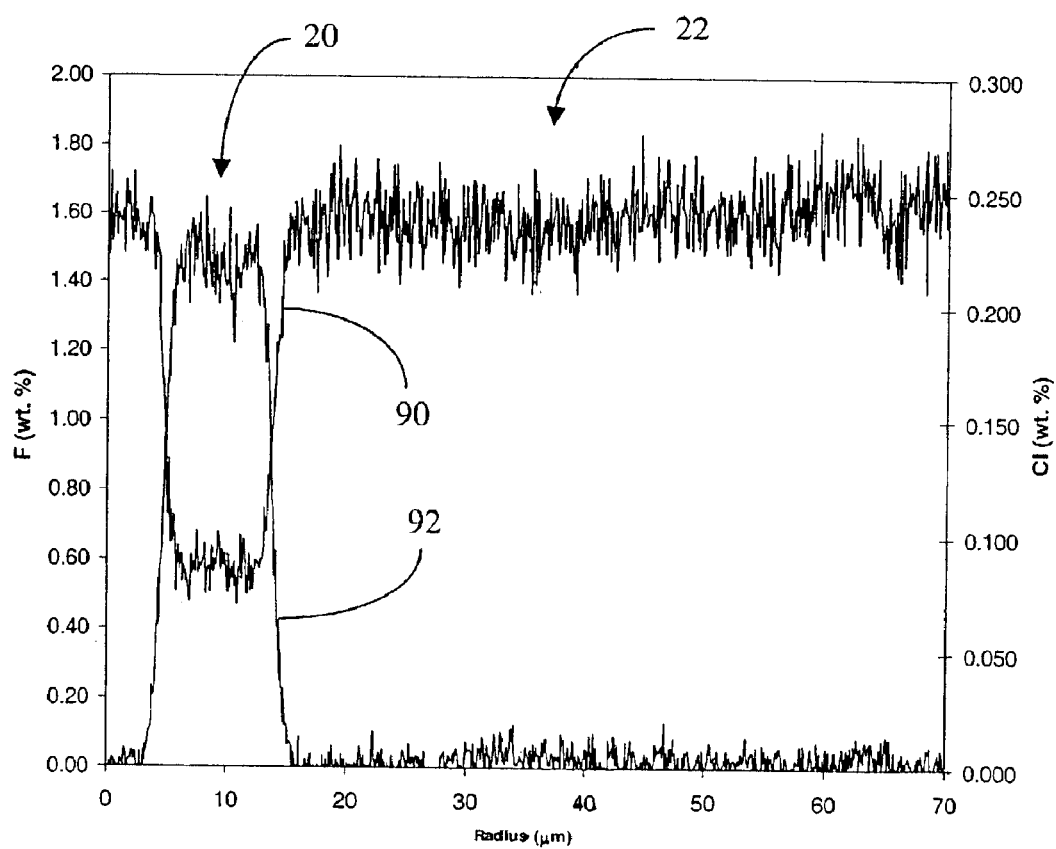
FIG. 15 depicts a microprobe analysis of an optical fiber according to the present invention showing the wt. % of F and Cl in the optical fiber.

In a second example, an optical fiber was made using the method described in the example supra. A microprobe analysis of the fiber, shown in FIG. 15, shows the wt. % F (curve 86) and the wt. % Cl (curve 88) as a function of fiber radius. The curves show that the average wt. % F in the core region 20 of the optical fiber was about 0.6 wt. % and the average wt. % Cl in the core region 20 was about 0.2 wt. %. The average wt. % F in the cladding region 22 is about 1.6 wt. %. The optical fiber represented by FIG. 15 would be expected to have a core relative refractive index % $\Delta_1$ of about −0.146% and a $T_{g1}$ of about 176.9 C. The cladding region would be expected to have a % $\Delta_2$ of −0.432% and a $T_{g2}$ of about 261.3° C. The expected difference between $T_{g1}$ and $T_{g2}$ was calculated to be 84.4° C.

It will be apparent to those skilled in the art that various modifications and variations can be made to the present invention without departing from the spirit and scope of the invention. Thus it is intended that the present invention cover the modifications and variations of this invention provided they come within the scope of the appended claims and their equivalents.

We claim:

1. An optical fiber comprising:
   a core region having a relative refractive index % $\Delta_1$ with respect to pure silica, and a glass transition temperature $T_{g1}$;
   a first cladding segment disposed about and in contact with the outer periphery of the core region, wherein the first cladding segment has a relative refractive index %$\Delta_2$ with respect to pure silica, and a glass transition temperature $T_{g2}$; and
   wherein the core region is doped with Cl and F, and the Cl and F are in an amount by wt. % effective to yield a difference between $T_{g1}$ and $T_{g2}$ of less than about 200° C.

2. The optical fiber of claim 1 further comprising an amount of Cl in the core region between about 0.1 wt. % and 3 wt. %.

3. The optical fiber of claim 2 wherein the amount of Cl in the core region is between about 0.5 wt. % and 2 wt. %.

4. The optical fiber of claim 1 further comprising an amount of F in the core region between about 0.1 wt. % and 2 wt. %.

5. The optical fiber of claim 4 wherein the amount of F in the core region is between 0.5 wt. % and 1 wt. %.

6. The optical fiber of claim 1 wherein a ratio of the amount of F to the amount of Cl in the core region is between about 1:2 and 1:4.

7. The optical fiber of claim 1 wherein the difference between $T_{g1}$ and $T_{g2}$ is less than 150° C.

8. The optical fiber of claim 7 wherein the difference between $T_{g1}$ and $T_{g2}$ is less than 100° C.

9. The optical fiber of claim 1 wherein a relative refractive index of the core region relative to the adjacent cladding segment %$\Delta_{12}$ is between about 0.3% and 0.54%.

10. The optical fiber of claim 1 further comprising a second cladding segment disposed about and in contact with the first cladding segment and having a relative refractive index with respect to pure silica %$\Delta_3$, and wherein $|\%\Delta_1|<|\%\Delta_3|<|\%\Delta_2|$, and %$\Delta_2$, %$\Delta_3$ and %$\Delta_1$ are negative.

11. The optical fiber of claim 1 further comprising a second cladding segment disposed about and in contact with the first cladding segment and having a relative refractive index with respect to pure silica %$\Delta_3$, and wherein $|\%\Delta_3|<|\%\Delta_1|<|\%\Delta_2|$, and %$\Delta_3$ and %$\Delta_1$ are negative.

12. A method of making the optical fiber of claim 1 further comprising drawing the optical fiber at a draw speed greater than about 2 meters per second.

13. A method of making the optical fiber of claim 12 wherein the optical fiber is drawn at a draw speed greater than about 9 meters per second.

14. The optical fiber of claim 1 wherein the optical fiber has an attenuation less than about 0.21 dB/km at 1550 nm.

* * * * *